(12) United States Patent
Altrock et al.

(10) Patent No.: US 11,092,138 B2
(45) Date of Patent: Aug. 17, 2021

(54) WIND TURBINE HAVING A SLIP RING TRANSMITTER

(71) Applicant: Nordex Energy SE & Co. KG, Hamburg (DE)

(72) Inventors: Olaf Altrock, Luebeck (DE); Stephan Babbel, Rostock (DE); Torsten Georg, Toenisvorst (DE)

(73) Assignee: Nordex Energy SE & Co. KG, Hamburg (DE)

( * ) Notice: Subject to any disclaimer, the term of this patent is extended or adjusted under 35 U.S.C. 154(b) by 1217 days.

(21) Appl. No.: 15/339,643

(22) Filed: Oct. 31, 2016

(65) Prior Publication Data

US 2017/0122294 A1 May 4, 2017

(30) Foreign Application Priority Data

Oct. 30, 2015 (EP) .................... 15192410

(51) Int. Cl.
| | |
|---|---|
| *F03D 17/00* | (2016.01) |
| *F03D 80/00* | (2016.01) |
| *F03D 1/00* | (2006.01) |
| *F03D 1/06* | (2006.01) |
| *H04B 1/03* | (2006.01) |
| *H04B 1/04* | (2006.01) |

(52) U.S. Cl.
CPC .............. *F03D 17/00* (2016.05); *F03D 1/00* (2013.01); *F03D 1/0691* (2013.01); *F03D 80/00* (2016.05); *H04B 1/03* (2013.01); *H04B 1/04* (2013.01); *F05B 2260/83* (2013.01); *Y02E 10/72* (2013.01)

(58) Field of Classification Search
CPC . F03D 17/00; F03D 80/00; F03D 1/00; F03D 1/0691; H04B 1/03; H04B 1/04; F05B 2260/83; Y02E 10/721; Y02E 10/72
See application file for complete search history.

(56) References Cited

U.S. PATENT DOCUMENTS

| | | | |
|---|---|---|---|
| 8,013,468 | B2 | 9/2011 | Lohr |
| 8,041,225 | B2 | 10/2011 | Hemmelmann et al. |
| 8,384,235 | B2 | 2/2013 | Baba et al. |
| 8,772,985 | B2 | 7/2014 | Lohr |
| 9,304,015 | B2 | 4/2016 | Angerpointner et al. |
| 9,530,307 | B2 * | 12/2016 | Shaw .................... F01D 17/085 |
| 9,787,160 | B2 * | 10/2017 | Wu ........................ H02K 55/02 |
| 2012/0074699 | A1 | 3/2012 | Kreidler et al. |
| 2015/0204309 | A1 | 7/2015 | Baun et al. |
| 2017/0052923 | A1 * | 2/2017 | Wang ...................... G06F 13/16 |

FOREIGN PATENT DOCUMENTS

DE    10 2008 028 017 A1    12/2008

\* cited by examiner

*Primary Examiner* — Franklin D Balseca
(74) *Attorney, Agent, or Firm* — Walter Ottesen, P.A.

(57) ABSTRACT

A wind turbine has a slip ring transmitter between a rotor hub and a nacelle for transmitting electrical signals with a data protocol. The slip ring transmitter is equipped with a signal amplifier device on the transmission side and with a signal evaluation device on the reception side. The signal amplifier device amplifies voltage values of signals for transmission via a slip ring transmitter. The signal evaluation device sets signals received via the slip ring transmitter to a value corresponding to the data protocol.

8 Claims, 2 Drawing Sheets

WIND TURBINE HAVING A SLIP RING TRANSMITTER

CROSS REFERENCE TO RELATED APPLICATION

This application claims priority of European patent application no. 15192410.7, filed Oct. 30, 2015, the entire content of which is incorporated herein by reference.

FIELD OF THE INVENTION

The present invention relates to a wind turbine having a slip ring transmitter which is arranged between a rotor hub and a nacelle for transmitting data with a data protocol.

BACKGROUND OF THE INVENTION

In the rotor hub of a wind turbine there are various systems, such as for example the pitch systems for the rotor blades, which are controlled by a central operational management system of the wind turbine. In order to control the pitch systems, and also in order to communicate signals of the pitch systems to the operational management system, data transmission is necessary between the rotating rotor hub and the stationary nacelle.

U.S. Pat. No. 8,013,468 discloses an arrangement for transmitting electrical signals, electrical energy or media over short distances between units which move with respect to one another. The transmission arrangement has a mechanical slip ring transmitter. The mechanical slip ring transmitter includes a rotor and a carbon brush holder with associated carbon elements for tapping the signals. The carbon brush holder or brush block is assigned a diagnostic unit which determines the state of the carbon elements and signals it to a central control unit. Furthermore, the diagnostic unit has a visual display device and an acoustics indicator device for the state of the carbon elements.

United States patent application publication 2012/0074699 has disclosed a wind turbine which has a rotational transmitter which is arranged concentrically with respect to a rotor bearing and has the purpose of supplying energy to electrical consumers which are arranged in the rotor hub, and has a primary part of the rotational transmitter which is connected to the nacelle. The rotor hub has a secondary part which is rotatably connected to the rotational transmitter, wherein alternating voltages between the primary part and secondary part are transmitted using two frequency converters.

United States patent application publication 2015/0204309 discloses a wind turbine in which, in order to transmit electrical power, galvanic contact can be established between a rotating component and a stationary component. In one variant of this, external electrical contacts are connected to one another.

DE 10 2008 028 017 A1 discloses a method and a diagnostic system for monitoring a slip ring system on electrical machines. In this context, temperatures of carbon brushes and/or flowing currents are determined and evaluated for diagnostic purposes.

U.S. Pat. No. 9,304,015 discloses a further slip ring unit with a state monitoring system.

U.S. Pat. No. 8,384,235 B2 discloses a wind turbine in which signals of a rotor-hub-side signal processing unit are exchanged with the signals of a nacelle-side signal processing unit via a slip ring. For the transmission, the information-carrying signals are modulated onto a low-frequency alternating voltage signal.

In wind turbines, slip ring transmitters have proven useful when transmitting electrical signals and electrical power between a rotating rotor hub and a fixed nacelle. For the transmission of electrical signals it is possible to use a galvanic, optical, inductive or capacitive transmission path. The disadvantage when using electrical slip ring transmitters is that faults frequently occur during the transmission of data.

SUMMARY OF THE INVENTION

It is an object of the invention to provide a wind turbine having a slip ring transmitter between a rotor hub and a nacelle, which wind turbine has a low level of susceptibility to faults during the transmission of data with a data protocol.

According to the invention, the object can, for example, be achieved via a wind turbine having a rotor hub; a nacelle; a slip ring transmitter disposed between the rotor hub and the nacelle and configured to transmit electrical signals with a data protocol; the slip ring transmitter having a transmission side and a reception side; the slip ring transmitter further having a signal amplifier device on the transmission side and a signal evaluation device on the reception side; the signal amplifier device being configured to amplify voltage values of applied signals for transmission via the slip ring transmitter; and, the signal evaluation device being configured to set signals received via the slip ring transmitter to a value corresponding to the data protocol.

The wind turbine according to the invention is equipped with a slip ring transmitter between a rotor hub and a nacelle for transmitting data with a data protocol. The slip ring transmitter has a signal amplifier device on the transmission side and a signal evaluation device on the reception side. Signals are transmitted here from the signal amplifier device to the signal evaluation device via the slip ring transmitter. The signal amplifier device amplifies voltage values of signals for transmission. The signal evaluation device resets the received signals to a value corresponding to the data protocol. The invention is based on the recognition that many of the problems occurring during the transmission of data are not a problem of the shielding used or the routing of the cable or some other aspect of electromagnetic compatibility. Instead, it is a case of locally fluctuating contact resistances which make the transmission of data more difficult. These local fluctuations can be compensated by amplifying the voltage values before the transmission.

In a preferred embodiment, a field bus protocol, in particular an interbus protocol, wherein voltage differences are evaluated is provided as a data protocol. Field bus protocols and their electrical properties are sufficiently known. In the wind turbine according to the invention, it is not the absolute voltage values of the applied signals which are evaluated but instead the respective voltage differences. The voltage differences can be present here between two voltages applied to connection terminals or between two voltages on different channels of the slip ring transmitter. This means that when the signals are amplified, the voltage values are not necessarily amplified in absolute terms but instead the difference between the voltage values is amplified. In particular, the amplified voltage differences are present in an interval with a minimum voltage value and a maximum voltage value, wherein the minimum and maximum voltage value preferably have opposing polarities. Such a change in the polarity of the signals to be transmitted can be used, for example, for the transmission of the data even if the data protocol does not provide such opposing polarity.

In a preferred embodiment, the signal evaluation device resets signals into the intervals predefined by the data protocol. Changes in the applied signals, such as occur, for example, as a result of fluctuating ohmic contact resistances, can be compensated during this conversion.

In this context, the data protocol can provide an interval with a minimum voltage value and a maximum voltage value, wherein these values have the same polarity.

In a further preferred embodiment, the signal evaluation device evaluates the magnitude of the voltage differences and indicates a defective transmission link of the slip ring transmitter if there is a voltage difference below a predetermined minimum difference. During the evaluation of the voltage differences, the signal evaluation device can also act on chronological mean values in order, for example, to avoid locally occurring changes in voltage.

In a preferred embodiment, a first assembly is provided which has a signal amplifier device and a signal evaluation device. Accordingly, a second assembly, which corresponds to the first assembly, is provided, the second assembly also having a signal amplifier device and a signal evaluation device. The signal amplifier device of the first assembly is preferably connected to the signal evaluation device of the second assembly, and likewise the signal evaluation device of the first assembly is connected to the signal amplifier device of the second assembly. As a result of the concept of the two assemblies which each have a signal amplifier device and a signal evaluation device, bidirectional communication is possible with simple means.

BRIEF DESCRIPTION OF THE DRAWINGS

The invention will now be described with reference to the drawings wherein.

DESCRIPTION OF THE PREFERRED
EMBODIMENTS OF THE INVENTION

Figure 1:
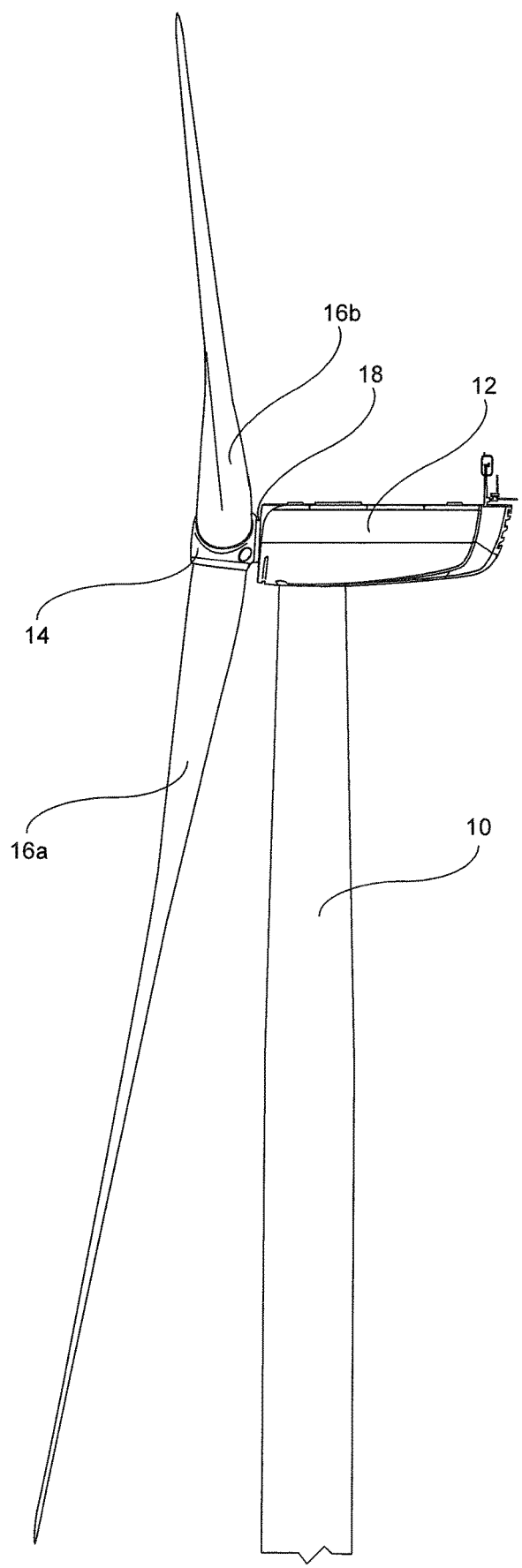
FIG. 1 shows a schematic view of a wind turbine having a tower, a nacelle and a rotor; and, FIG. 2 shows a schematic view of a slip ring transmitter.
Figure 2:
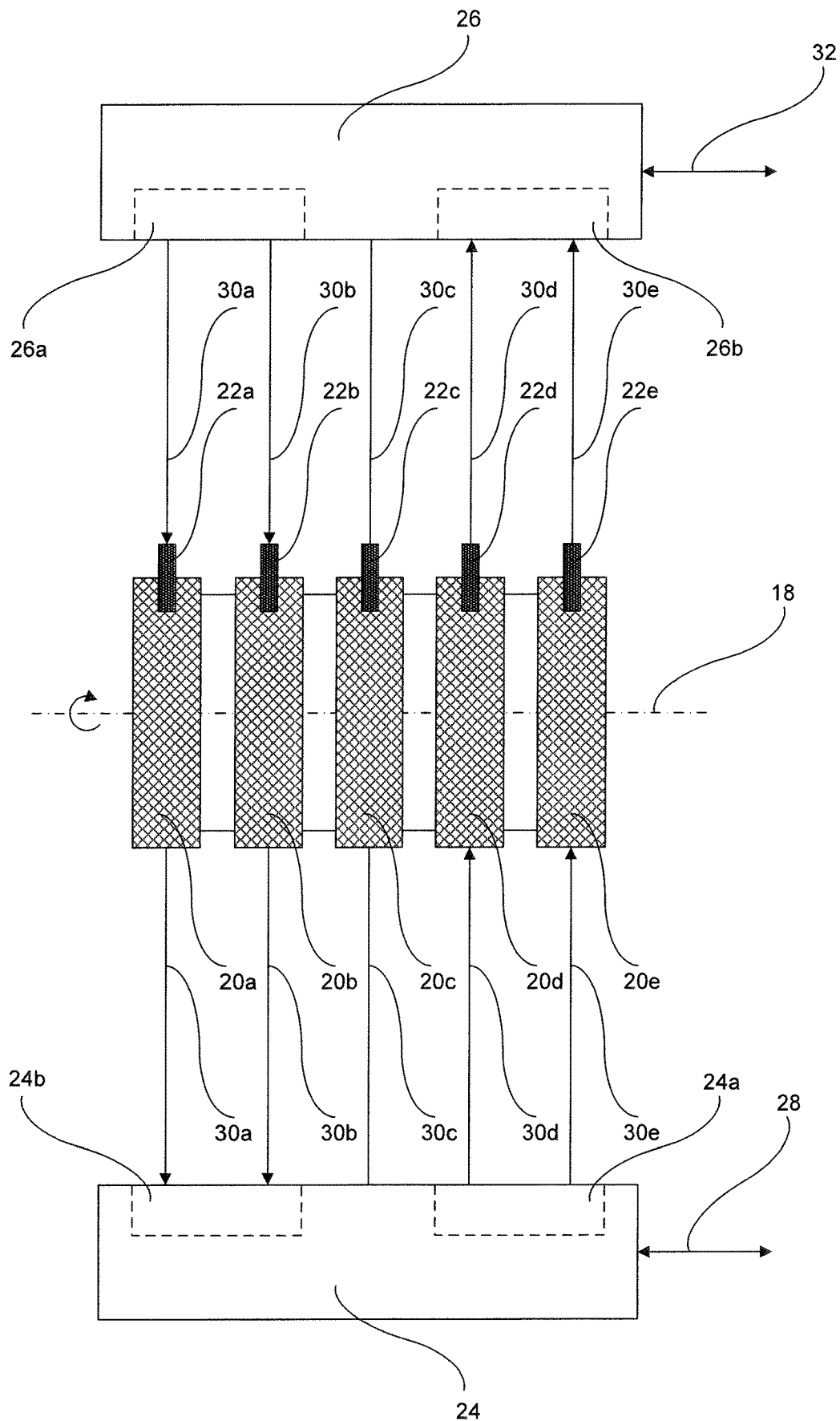

FIG. 1 shows a tower 10 of a wind turbine, on which tower 10 a nacelle 12 is arranged. The nacelle 12 is mounted so as to be rotatable about the longitudinal axis of the tower 10 with a rotational connection, and can be oriented with respect to the wind using, for example, a yaw drive. The nacelle 12 bears a rotor hub 14 on which three rotor blades 16 are arranged. Of the rotor blades 16, the rotor blades 16a and 16b are illustrated in a side view. The rotor hub 14 is mounted on a rotor shaft 18. The rotor shaft 18 is rotatably mounted in the nacelle 12 in order to drive a generator therein. For a pitch controller or other control devices provided in the rotor hub such as, for example, a de-icing device, it is necessary to transmit data from the nacelle 12 into the rotatable rotor hub 14. For this purpose, the rotor shaft 18 has a slip ring transmitter. The principle of a slip ring transmitter is illustrated in FIG. 2. FIG. 2 illustrates, for example, five slip rings 20a, 20b, 20c, 20d, 20e which are insulated electrically from one another and rotate with the rotor shaft 18. There are slip ring transmitters with more than five slip rings. Brushes 22a, 22b, 22c, 22d, 22e, via which the voltage signals 30a, 30b, 30c, 30d, 30e are tapped at the slip rings 20a, 20b, 20c, 20d, 20e or applied to the slip rings 20a, 20b, 20c, 20d, 20e, are in mechanical contact with the slip rings 20a, 20b, 20c, 20d, 20e. Slip ring transmitters in which individual wires, carbon brushes, wire bundles or contact plates tap the voltage signals at the slip rings or apply them to the slip rings are also known. A signal amplifier device 24a amplifies the voltage signals applied via the interbus data line 28 and applies them as amplified voltage signals 30d, 30e to the slip rings 20d, 20e. The common reference potential GND 30c, required for the transmission of signals, is passed on from a first assembly 24 to a second assembly 26 via the slip ring 20c and the brush 22c. The first assembly 24 has a signal amplifier device 24a and a signal evaluation device 24b, and the second assembly 26 has a signal amplifier device 26a and a signal evaluation device 26b. The amplified voltage signals 30d, 30e which are tapped at the brushes 22d, 22e are passed onto a signal evaluation device 26b, wherein the latter converts the amplified voltage signals 30d, 30e again into the voltage ranges predefined by the interbus data protocol and outputs them as voltage signals to the interbus data line 32. In the illustrated embodiment, the slip rings 20a, 20b, 20c, 20d, 20e rotate with the rotor shaft 18, and the brushes 22a, 22b, 22c, 22d, 22e are fixedly connected to the nacelle 12.

In the opposing direction of signal flow, a signal amplifier device 26a amplifies the voltage signals applied via the interbus data line 32 and applies them as amplified voltage signals 30a, 30b to the slip rings 20a, 20b via the brushes 22a, 22b. The common reference potential GND 30c required for the transmission of signals is passed on from the assembly 26 to the assembly 24 via the brush 22c and the slip ring 20c. The amplified voltage signals 30a, 30b applied to the slip rings 20a, 20b are passed onto a signal evaluation device 24b, wherein the latter converts the amplified voltage signals 30a, 30b again into the voltage ranges predefined by the interbus data protocol and outputs them as voltage signals to the interbus data line 28.

The transmission of data operates with differential levels, wherein a difference between two voltage signals is continuously evaluated. The interbus protocol provides, for example, that the minimum differential levels have to be exceeded in absolute terms between, in each case, two interbus lines so that an input stage changes into another logical state. Open inputs, to which no defined state is assigned, are connected via electrical resistances in such a way that they reliably change into a defined logical state. In the normal interbus, a transmitter generally uses only positive levels with voltage values of 0 V and 5 V.

The object of the signal amplifier device 24a, 26a is to determine the magnitude of the voltage signals in a normal interbus transmitter. With the logical signal which is determined in this way, two amplifiers are actuated which output a higher output voltage to the slip ring transmitter than the normal interbus transmitter. This also means that possible negative input voltage ranges are used. It is therefore possible, for example, for the amplified voltage signals to be at +12 V to −10 V.

The signal evaluation device 24b, 26b evaluates the voltage signals picked up via the brushes 22a, 22b, 22c, 22d, 22e and converts them again into the voltage ranges predefined by the interbus data protocol. The embodiment shown in FIG. 2 shows a communication device in which data signals flow to the, for example, fixed brushes 22a, 22b, 22c, 22d, 22e via the slip ring transmitter.

It is understood that the foregoing description is that of the preferred embodiments of the invention and that various changes and modifications may be made thereto without departing from the spirit and scope of the invention as defined in the appended claims.

What is claimed is:

1. A wind turbine comprising:
a rotor hub;
a nacelle;
a bidirectional slip ring transmitter disposed between said rotor hub and said nacelle and configured to transmit electrical signals therebetween in mutually opposite directions and with a data protocol;
said bidirectional slip ring transmitter having a plurality of slip rings and having a first end communicating with said nacelle and a second end communicating with said rotor hub;
said bidirectional slip ring transmitter defining mutually adjacent first and second slip ring transmitter units;
said plurality of slip rings including a ground slip ring common to both of said first and second slip ring transmitter units;
said first slip ring transmitter unit including a first signal amplifier device at said first end configured to amplify voltage values of first applied signals for transmission thereof to said second end via a first slip ring of said plurality of slip rings and said ground slip ring;
said first slip ring transmitter unit further including a first signal evaluation device at said second end configured to set signals received via said first slip ring and said ground slip ring to a value corresponding to said data protocol;
said second slip ring transmitter unit including a second signal amplifier device at said second end configured to amplify voltage values of second applied signals for transmission thereof to said first end via a second slip ring of said plurality of slip rings and said ground slip ring; and,
said second slip ring transmitter unit further including a second signal evaluation device at said first end configured to set signals received via said second slip ring and said ground slip ring to a value corresponding to said data protocol.

2. The wind turbine of claim 1, wherein said data protocol is a field bus protocol in which voltage differences are evaluated.

3. The wind turbine of claim 1, wherein said data protocol is an interbus protocol in which voltage differences are evaluated.

4. The wind turbine of claim 1, wherein each one of said first and second signal amplifier devices is configured to amplify voltage differences applied thereto.

5. The wind turbine of claim 4, wherein the amplified voltage differences lie in an interval having a minimum voltage value and a maximum voltage value; and, said minimum voltage value and said maximum voltage value have opposing polarity.

6. The wind turbine of claim 1, wherein each one of said first and second signal evaluation devices is configured to convert signals applied thereto into an interval predefined by said data protocol.

7. The wind turbine of claim 6, wherein said interval predefined by said data protocol has a minimum voltage value and a maximum voltage value; and, said minimum voltage value and said maximum voltage value have a same polarity.

8. A wind turbine comprising:
a rotor hub;
a nacelle;
a slip ring transmitter disposed between said rotor hub and said nacelle and configured to transmit electrical signals with a data protocol;
said slip ring transmitter having a transmission side and a reception side;
said slip ring transmitter further having a signal amplifier device on said transmission side and a signal evaluation device on said reception side;
said signal amplifier device being configured to amplify voltage values of applied signals for transmission via said slip ring transmitter;
said signal evaluation device being configured to set signals received via said slip ring transmitter to a value corresponding to said data protocol; and,
wherein said signal evaluation device is configured to evaluate a magnitude of voltage differences and to signal one of a plurality of possible states of said slip ring transmitter in an event of voltage differences being below a predefined minimum difference.

\* \* \* \* \*